United States Patent
Kelly

(10) Patent No.: US 12,455,215 B2
(45) Date of Patent: Oct. 28, 2025

(54) SYSTEM, METHOD AND APPARATUS FOR GENERATING RANDOMLY ALIGNED FIBER BEARDS FOR OBJECT EVALUATION

(71) Applicant: Texas Tech University System, Lubbock, TX (US)

(72) Inventor: Brendan Kelly, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 382 days.

(21) Appl. No.: 17/970,565

(22) Filed: Oct. 21, 2022

(65) Prior Publication Data

US 2023/0122062 A1    Apr. 20, 2023

Related U.S. Application Data

(60) Provisional application No. 63/257,645, filed on Oct. 20, 2021.

(51) Int. Cl.
*G01N 1/04* (2006.01)
*G01N 3/36* (2006.01)
*G01N 33/36* (2006.01)

(52) U.S. Cl.
CPC ............... *G01N 1/04* (2013.01); *G01N 3/362* (2013.01)

(58) Field of Classification Search
CPC .... G01N 1/04; G01N 33/362; G01N 21/8915; G01N 33/365
See application file for complete search history.

(56) References Cited

U.S. PATENT DOCUMENTS

| | | | |
|---|---|---|---|
| 4,391,153 A | 7/1983 | Taylor | |
| 6,085,584 A * | 7/2000 | Ramachandran | G01N 33/362 73/159 |
| 7,143,642 B1 * | 12/2006 | Baxter | G01N 33/362 73/159 |
| 7,345,756 B2 * | 3/2008 | Shofner | D01G 31/006 700/142 |
| 9,909,965 B2 * | 3/2018 | Musesti | G01N 3/08 |
| 2002/0157164 A1 | 10/2002 | Shofner et al. | |
| 2013/0068009 A1 | 3/2013 | Ghorashi et al. | |
| 2020/0300738 A1 * | 9/2020 | Harris | G01N 3/04 |
| 2023/0122062 A1 | 4/2023 | Kelly | |

FOREIGN PATENT DOCUMENTS

| | | | | |
|---|---|---|---|---|
| CN | 108398308 B * | 11/2024 | ............ | G01N 1/286 |
| EP | 0392195 A1 * | 10/1990 | | |
| WO | 2023069663 A1 | 4/2023 | | |

OTHER PUBLICATIONS

International Searching Authority, International Search Report and Written Opinion for PCT/US2022/047339, date of mailing Feb. 9, 2023; 16 pages.

* cited by examiner

*Primary Examiner* — Octavia Hollington
(74) *Attorney, Agent, or Firm* — Dickinson Wright PLLC; Kristopher Lance Anderson

(57) ABSTRACT

The present disclosure provides a system, apparatus and method for generating randomly aligned fiber beards for evaluation. The system comprises abase and an x-axis frame member couples to and is positioned parallel to the base. A y-axis frame member is couple to and positioned perpendicular to the base. A sample plate is removably coupled to the y-axis frame member and defines one or more holes. A fiber clamp couples to and is movable by the x-axis frame member perpendicularly to the sample plate.

11 Claims, 28 Drawing Sheets

SYSTEM, METHOD AND APPARATUS FOR GENERATING RANDOMLY ALIGNED FIBER BEARDS FOR OBJECT EVALUATION

CROSS-REFERENCE TO RELATED APPLICATIONS

This application is a Utility Application which claims benefit and priority to U.S. Provisional Patent Application Ser. No. 63/257,645, filed Oct. 20, 2021, entitled "System, Method And Apparatus For Generating Randomly Aligned Fiber Beards For Object Evaluation," and which patent application is commonly owned by the owner of the present invention. This patent application is hereby incorporated by reference in its entirety for all purposes.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

This application generally relates to generating randomly aligned staple fiber beards for object evaluation. In particular, the present disclosure provide a system, method and apparatus for the evaluating natural and synthetic fibers and is designed fit the various needs in the textile industry.

STATEMENT OF FEDERALLY FUNDED RESEARCH

None.

BACKGROUND OF THE DISCLOSURE

In the textile industry, fibers need to be tested for different qualities including length, strength, fineness, and color in order to determine where they would be the most useful. The U.S. textile industry consumes around 718,490 metric tons of cotton per year. Also, about 80% of the U.S. cotton crop is now exported to surrounding countries. The quality and types of fibers that come from cotton are numerous. Similarly, hemp fibers are beginning to replace cotton fibers as hemp provides advantages over cotton such as increased strength and durability in certain applications. As with any industry, certain quality characteristics are more suitable for certain applications, and the wrong quality of fiber could lead to bad quality products being produced. Accordingly, there exist various machines for determining the quality of a fiber.

The most common machine for testing a fiber's quality is the high volume instrument (HVI). HVI systems take parallel bundles of fibers and report on the mean length and uniformity index of the bundle. However, there is very little data reported concerning individual fiber metrics of the distribution of fiber lengths. Without these added fiber qualities, the ability to accurately predict yarn quality becomes much harder. One way around this lack of information is to use a different method of fiber analysis known as Advanced Fiber Information System (AFIS). AFIS is able to provide a more detailed report about individual fiber qualities; however, AFIS testing is costly, takes more time, and is not as widely distributed as HVI. Similar, Textechno FAVIMAT is another machine, but is also costly, takes more time, and is not widely distributed. In the domestic hemp industry, HVI is sometimes used. This machine, however, is not designed for hemp fibers, and fails to provide all the relevant information needed. Resulting in inaccurate reporting or expensive secondary testing.

It is therefore a need in the art to develop an economically feasible system for assessing objective fiber information within a sample of fiber, such as a hemp fiber.

SUMMARY OF THE DISCLOSURE

Embodiments of a system, method and apparatus for generating randomly aligned fiber beards for evaluation is disclosed. For example, a system may comprise a base and an x-axis frame member couples to and is positioned parallel to the base. The system may have a y-axis frame member is couple to and positioned perpendicular to the base. The system may also have a sample plate that is removably coupled to the y-axis frame member and defines one or more holes. A fiber clamp may couple to and be movable by the x-axis frame member perpendicularly to the sample plate.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

The use of the same reference symbols in different drawings indicates similar or identical items.

DETAILED DESCRIPTION OF THE DISCLOSURE

Figure 1:
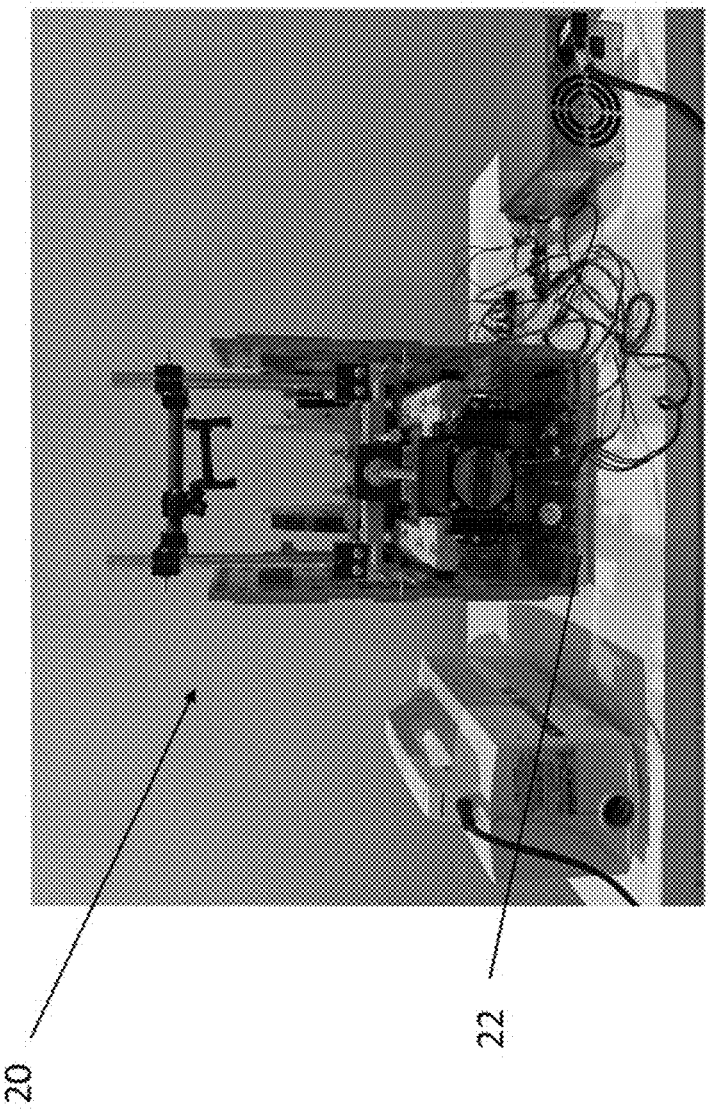
FIG. 1 is a perspective view of a system and apparatus of the present disclosure.
Figure 2:
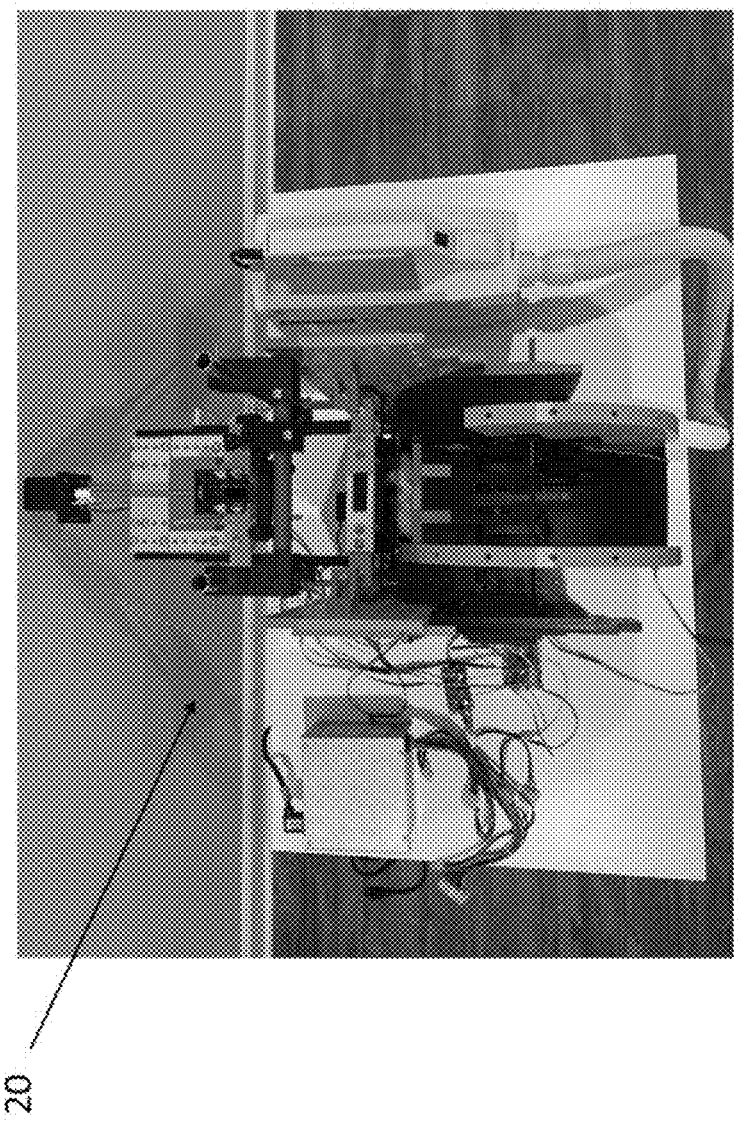
FIG. 2 is a top view of a system and apparatus of the present disclosure.
Figure 3:
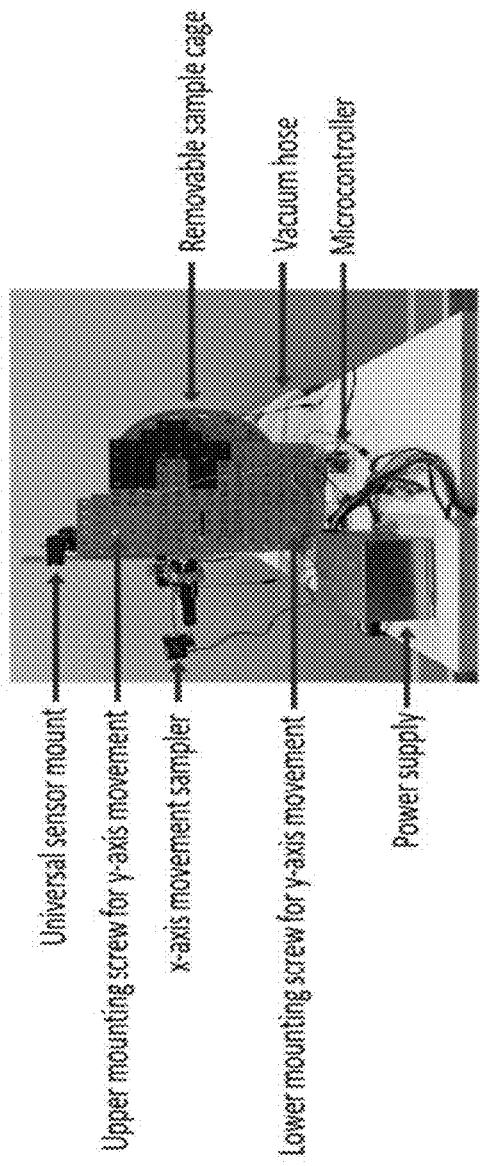
FIG. 3 is a side view of a system and apparatus of the present disclosure.
Figure 4:
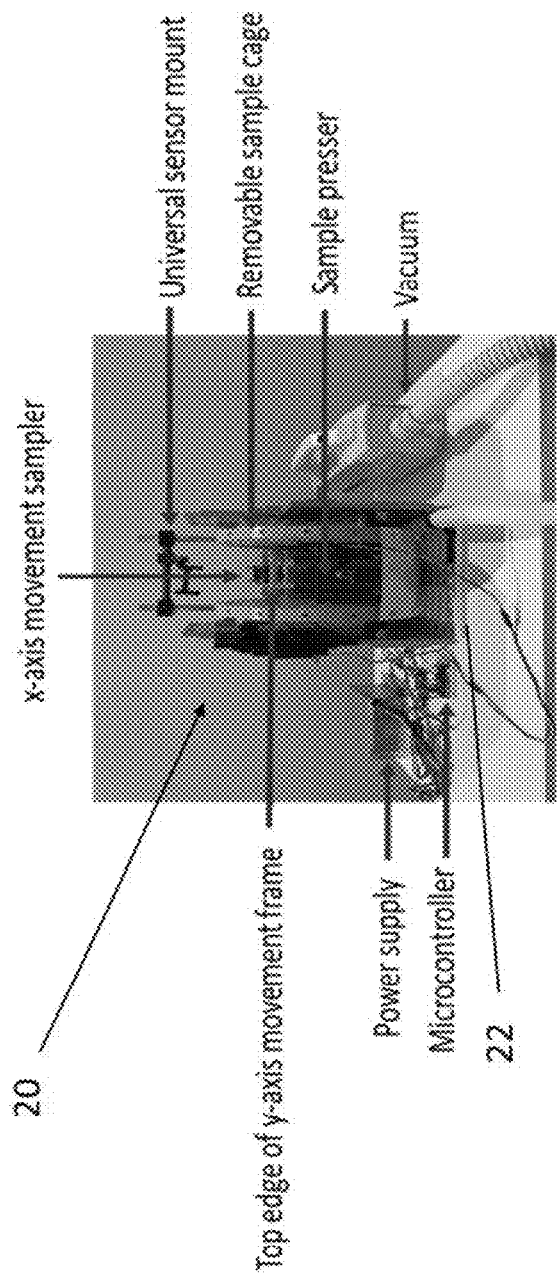
FIG. 4 is a side view of a system and apparatus of the present disclosure.
Figure 5:
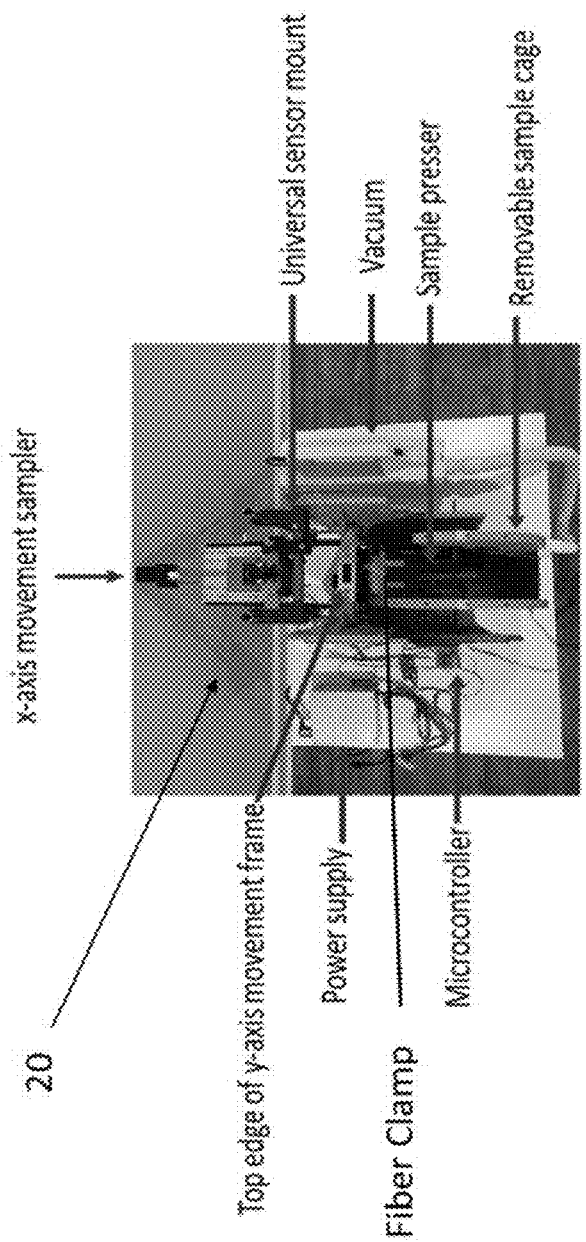
FIG. 5 is a top-perspective view of a system and apparatus of the present disclosure.
Figure 6:
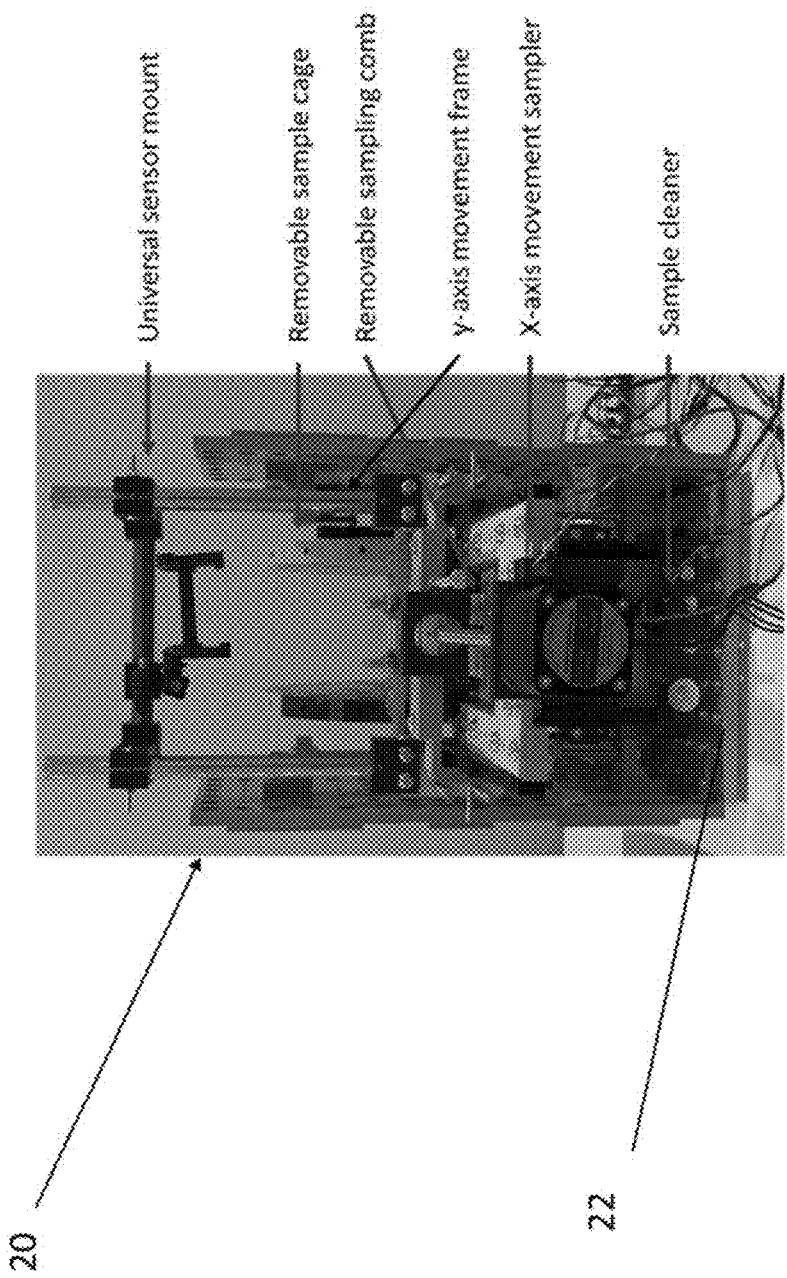
FIG. 6 is a close-up side-perspective view of a system and apparatus of the present disclosure.

FIGS. 1-8 depict embodiments of a system, method and apparatus for objective evaluation of staple fibers of different type include both nature and synthetic fibers. The system and apparatus (or just system) 20 has a base 22. With reference to FIG. 6, the base 22 supports an x-axis and a y-axis frame member. The x-axis frame member may be an x-axis sample and is generally aligned parallel with the base 22. The x-axis sample is movable along an x-axis (see e.g., FIG. 9). The y-axis frame member may couple to the base 22 or the x-axis frame remember and is positioned to be generally perpendicular to the x-axis sample. The y-axis frame member movable along a y-axis (see e.g., FIG. 9).

Figure 11:
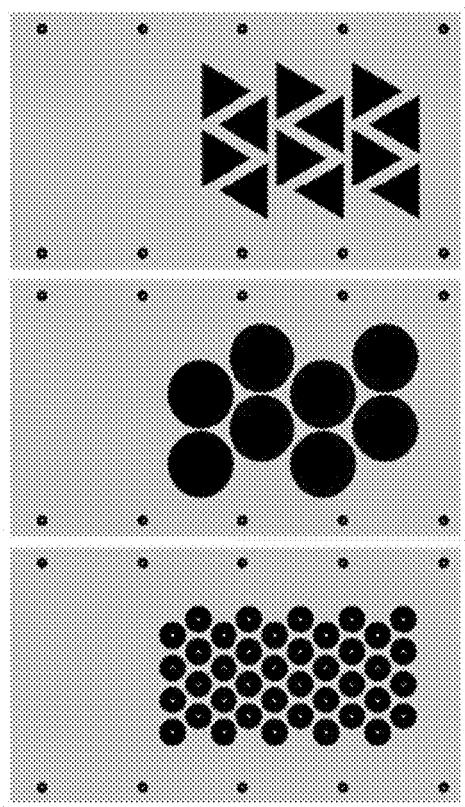
FIG. 11 is a front view of three different grid plates of the present disclosure.
Figure 18:
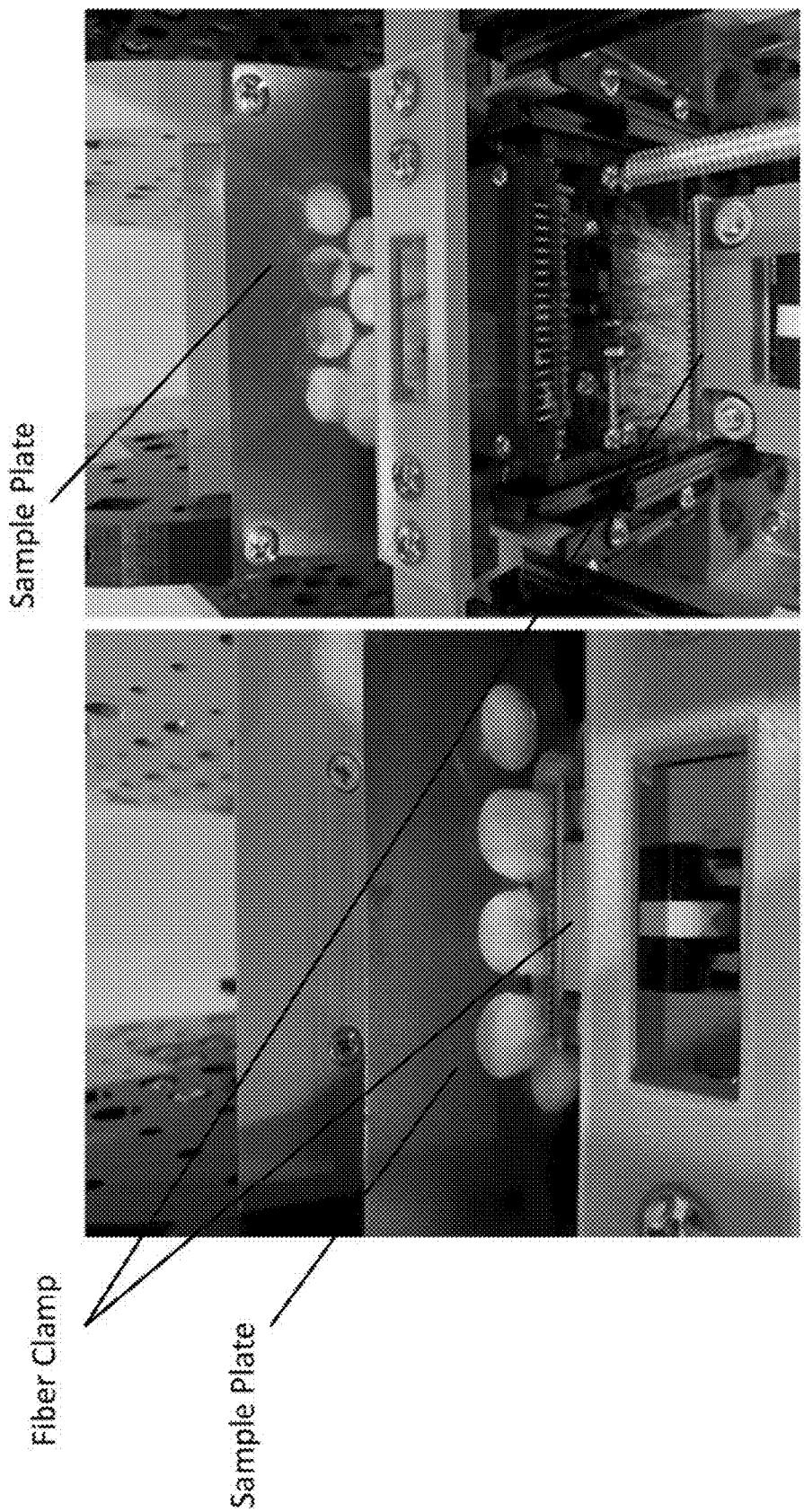
FIG. 18 shows various views of a sampling clamp engaged with a sampling cage and taking a sample of cotton fiber.
Figure 19:
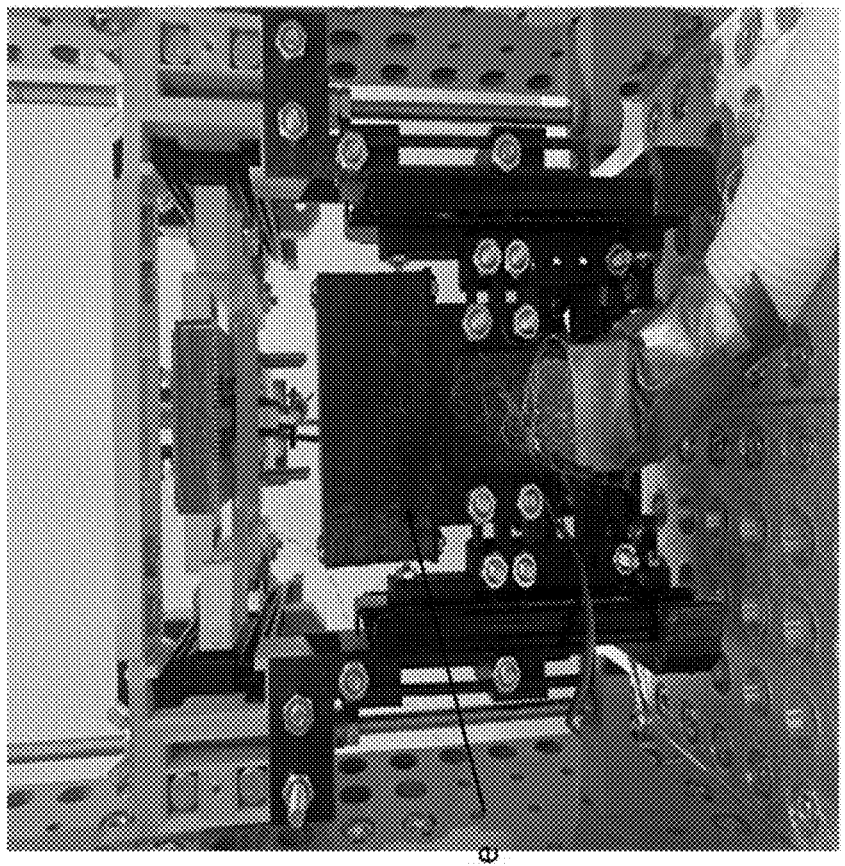
FIG. 19 is a rear view of a system and apparatus of the present disclosure showing a sample cleaning module.
Figure 20:
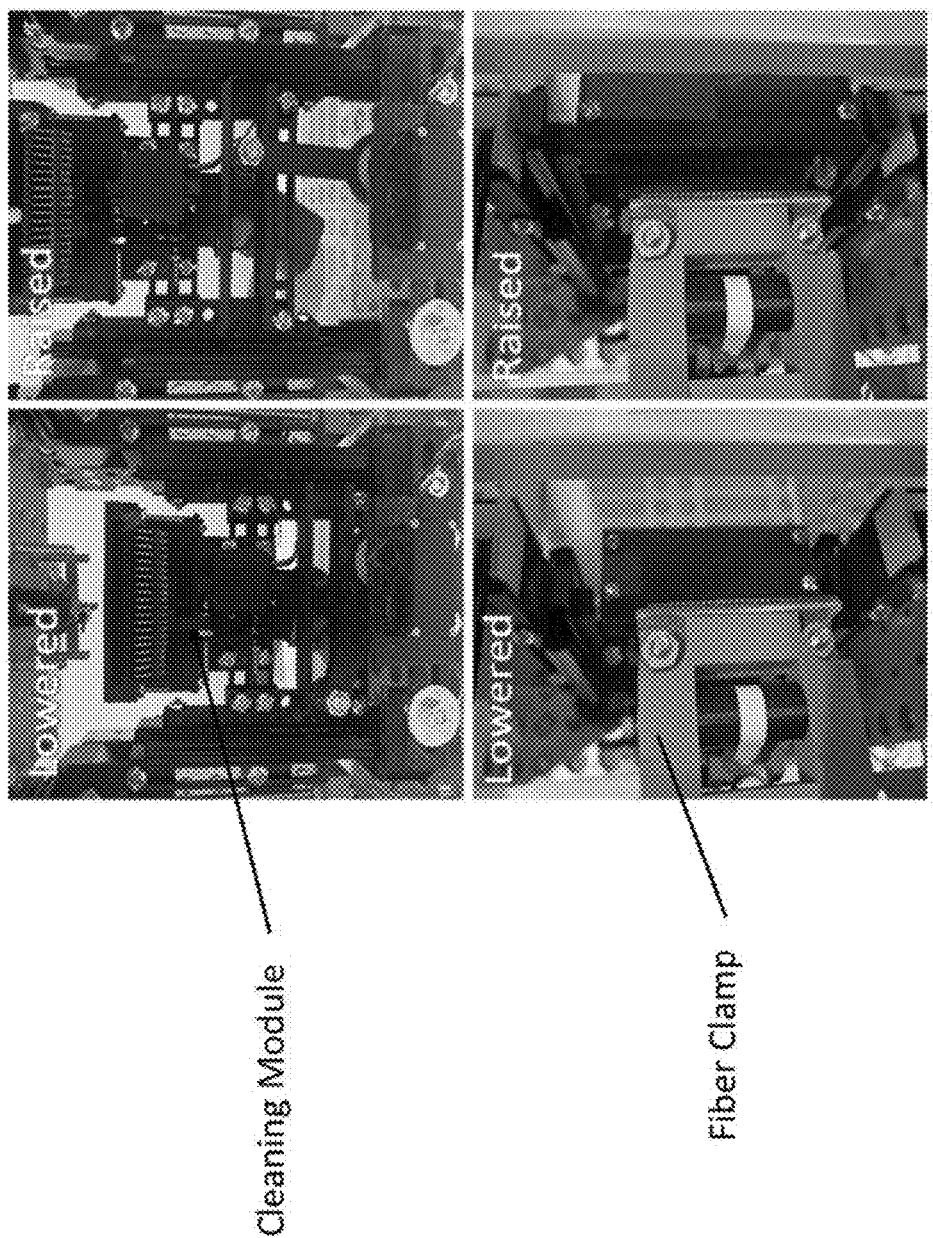
FIG. 20 shows a cleaning module in lowered and raised positions.
Figure 21:
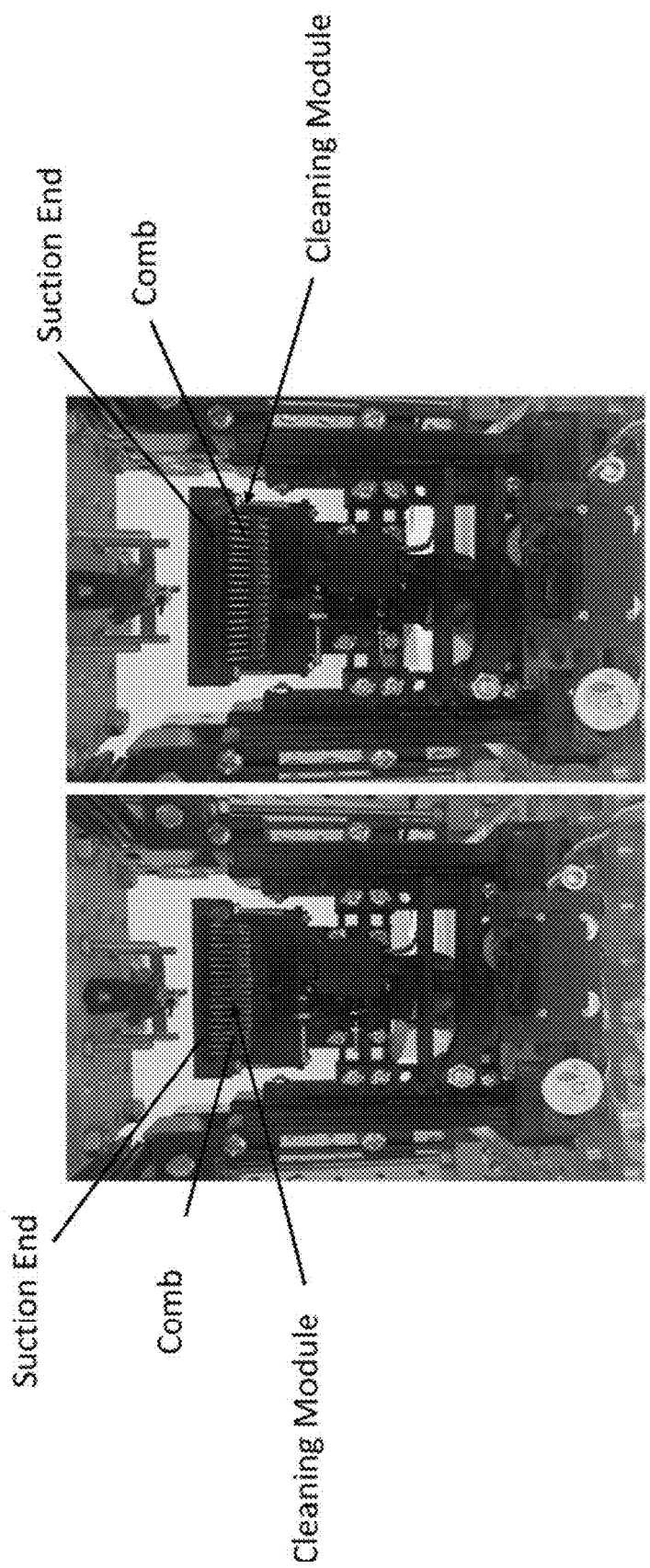
FIG. 21 shows a cleaning module of the present disclosure with a cleaning comb partially closed and fully open.
Figure 22:
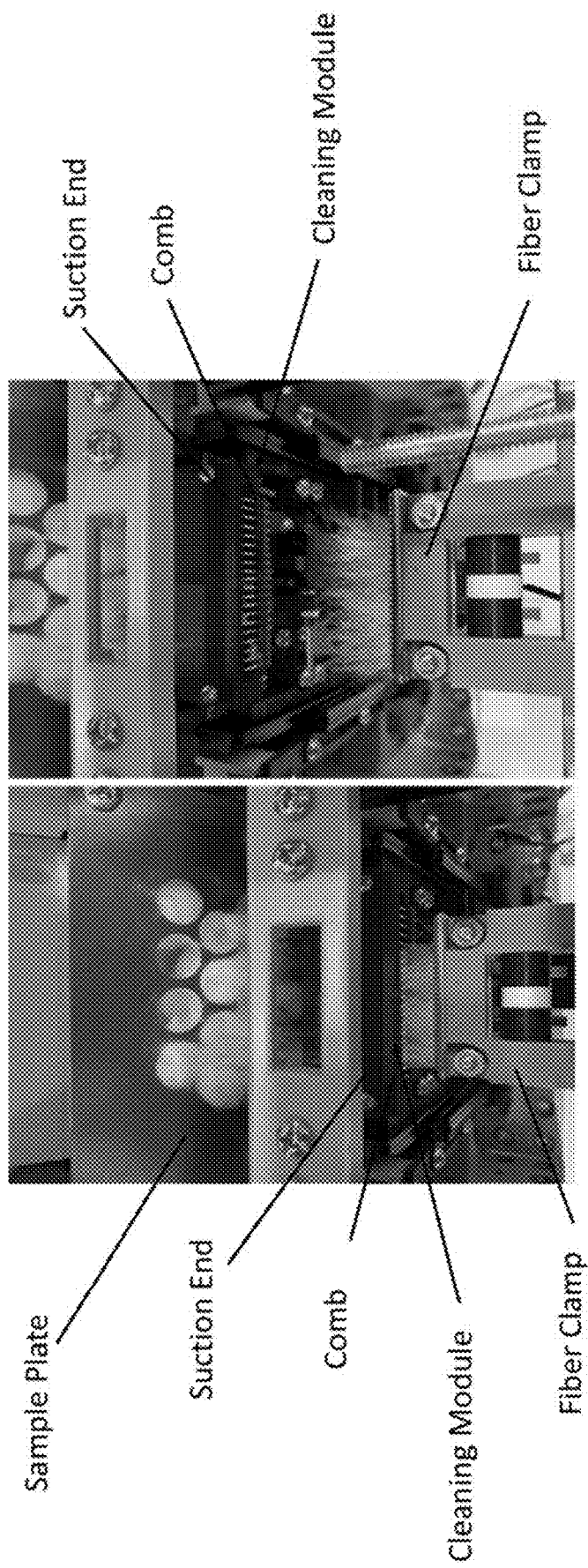
FIG. 22 shows a cleaning module applying suction to a sample with a comb engaged in cleaning the sample.
Figure 23:
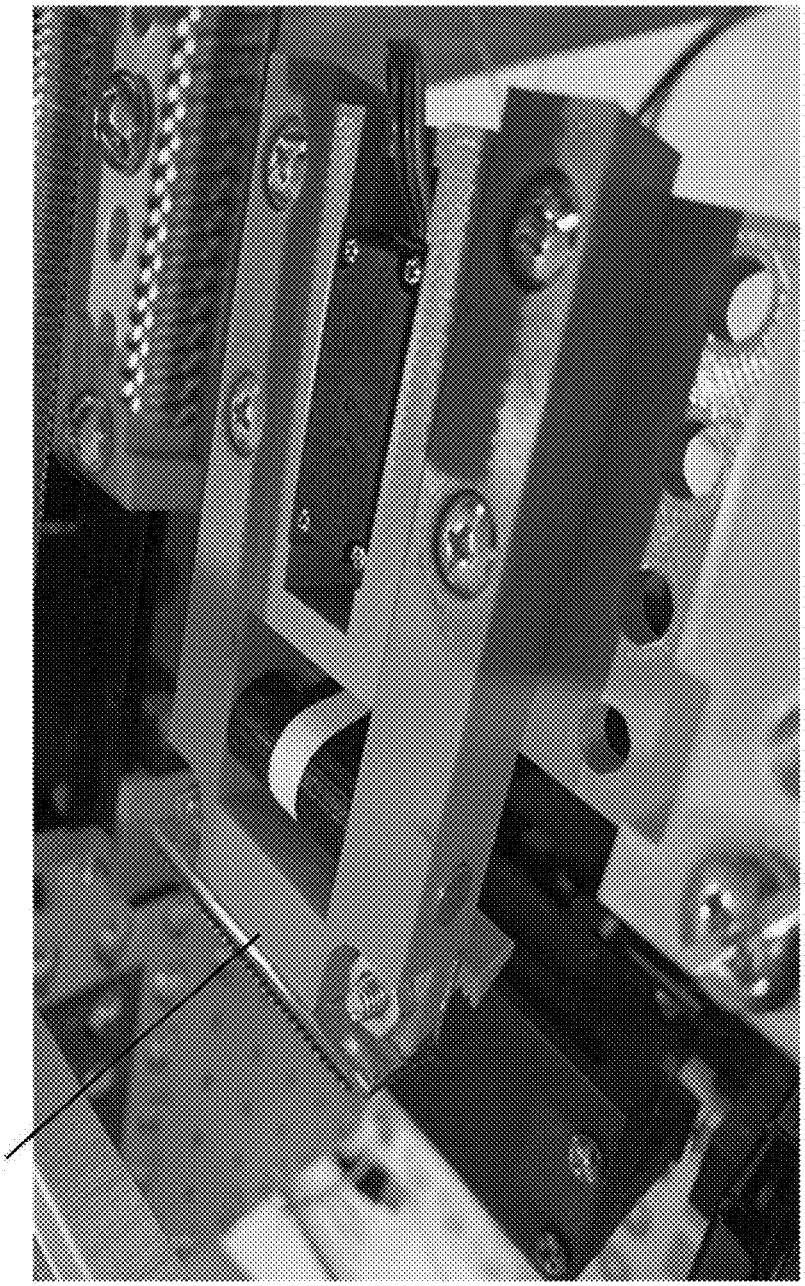
FIG. 23 is a side view of a clamp of the present disclosure.
Figure 24:
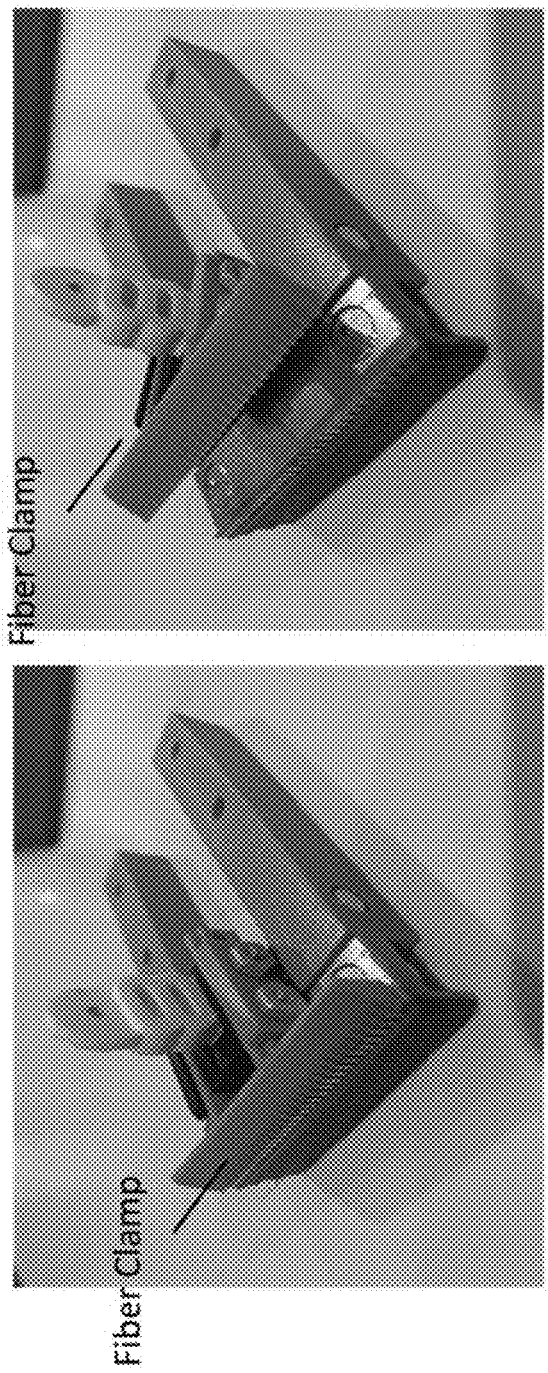
FIG. 24 shows a clamp of the present disclosure in an open and a closed position.
Figure 25:
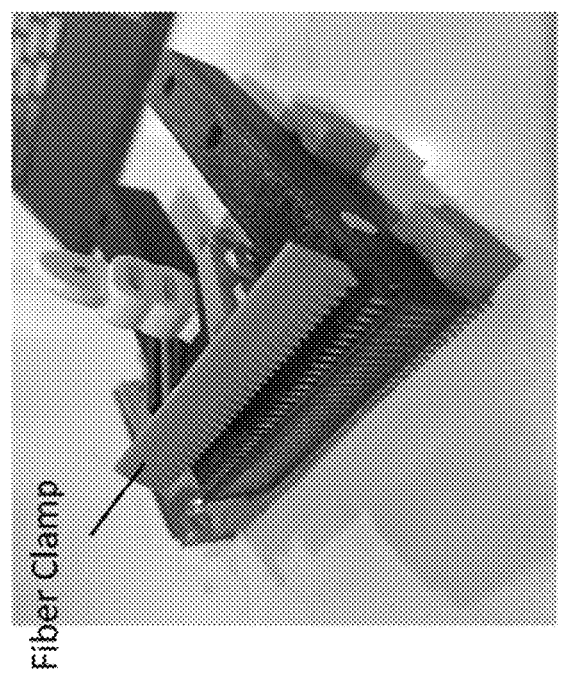
FIG. 25 is a perspective view of a clamp of the present disclosure.

The system 20 has a sample cage and the sample cage has a hole design suitable for the fiber being evaluated. The sample cage of the present disclosure may be removable to accommodate interchanging of sample cages with various hole designs suitable for the evaluation of specific fibers. Some embodiments may be circular holes of various sizes or triangular holes. The sample cage is generally mounted to the y-axis frame member by upper and lower mounting screws. However, alternative methods of mounting the sample cage to the y-axis frame member may be used. A sample plate may couple be attached to the sample cage and have various hole designs suitable for the evaluation of specific fibers (see e.g., FIG. 18). Embodiments of various holes designs of the sample cage is shown in FIG. 11.

Figure 12:
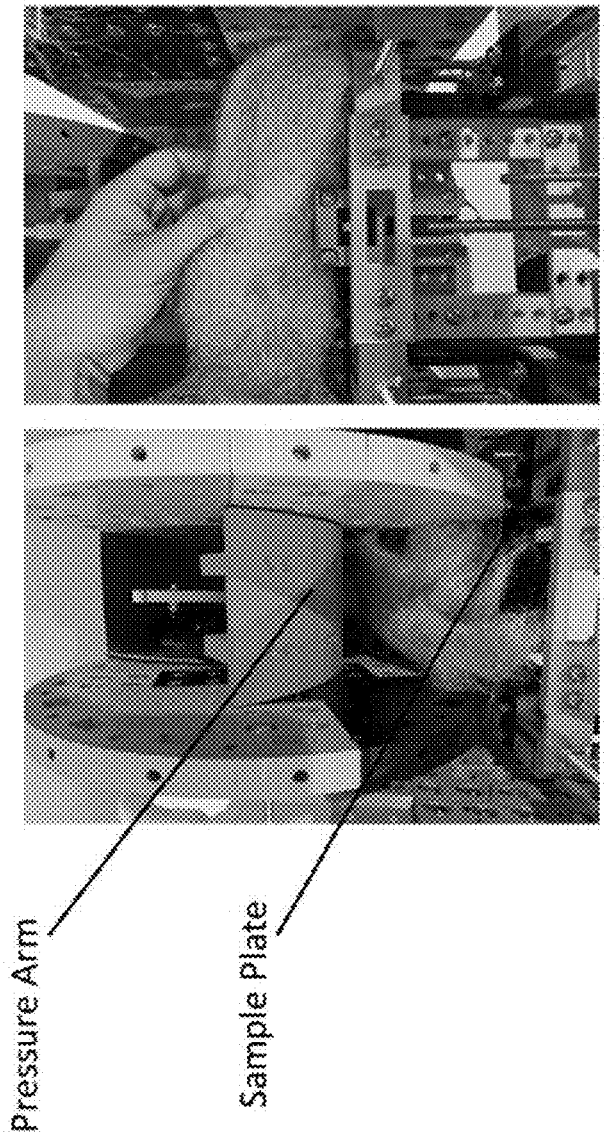
FIG. 12 is a perspective view of a system and apparatus of the present disclosure showing a jute fiber being placed in a sample cage.

A similar sample cage is used in some existing systems (Uster HVI 1000, https://www.uster.com/en/instruments/cotton-classing/uster-hvi-2/;Premier http://www.premierevolvics.com/overview.php?config=5&cid=2&sub=7). However, the technology presented here provides key advantages over existing systems. For example, existing systems use a fixed hole spacing pattern that is optimized for sampling cotton fiber. The sample cage of the present disclosure, however, is removable and interchangeable depending on the fiber testing application. Accordingly, if a fiber needs to be tested that is not compatible with the standard hole pattern used for cotton, a cage with a different hole grid plate design can be used (FIG. 11). In addition, many types of samples lack the mechanical properties required to protrude significantly from the plate holes, regardless of pressure, or a simply too weak. In such scenarios, the sample cage/plate can be removed entirely and the sample can be presented directly to the fiber clamp (FIG. 12).

Figure 13:
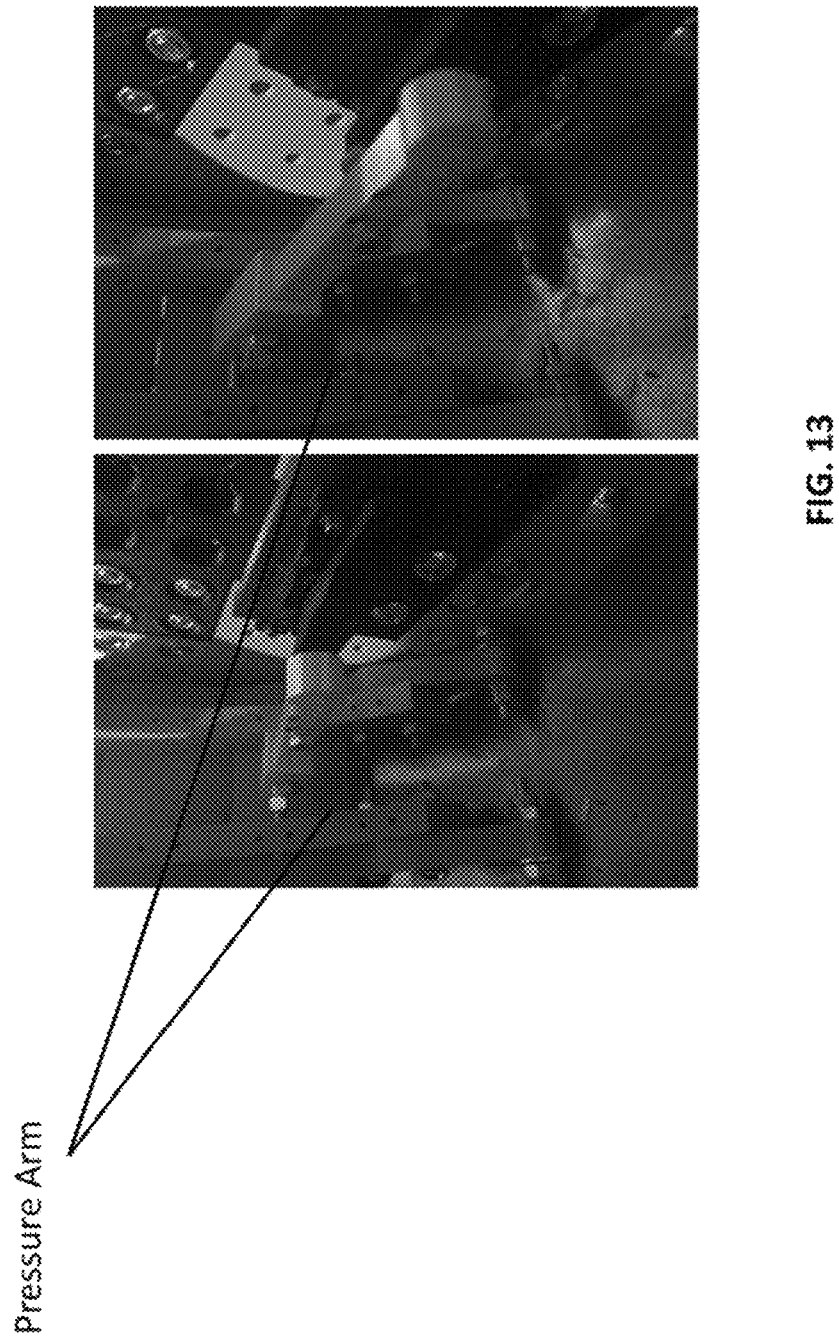
FIG. 13 is a perspective view of a system and apparatus of the present disclosure showing a sample presser in various stages pressing a sample against a grid plate.
Figure 14:
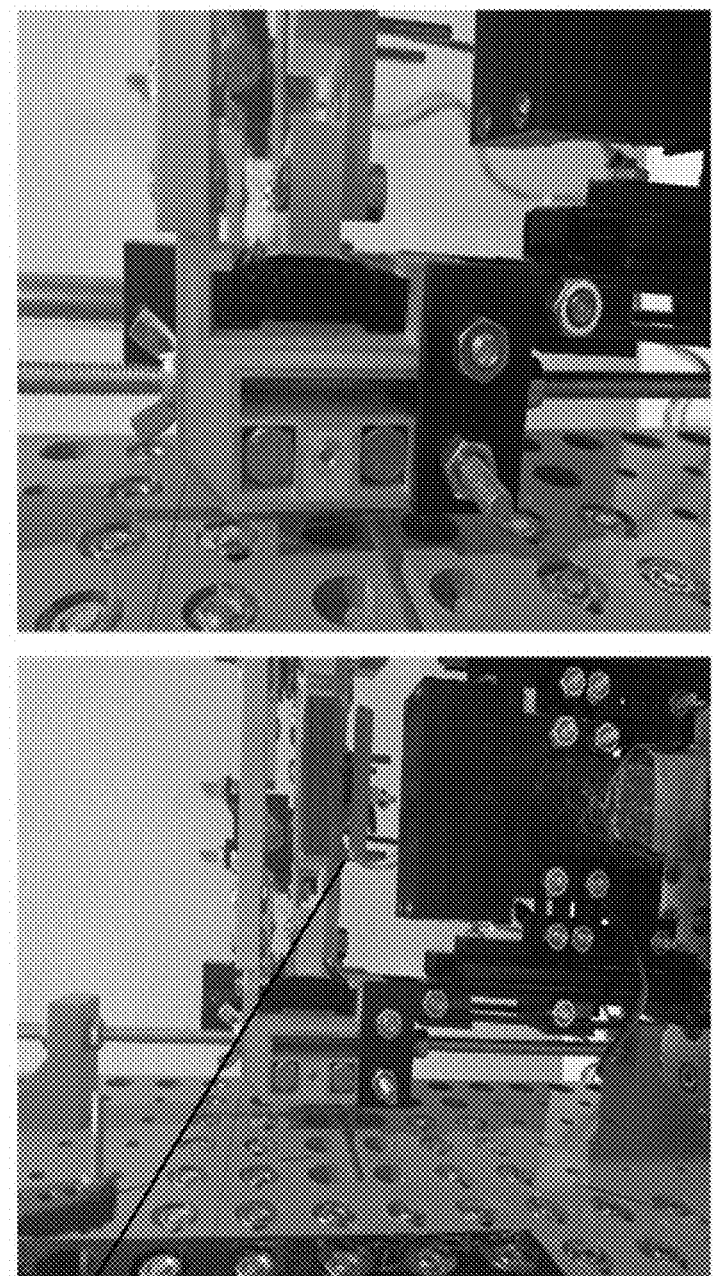
FIG. 14 shows a side/perspective view of y-axis adjustments of a jaw relative to a sample cage of the present disclosure.
Figure 15:
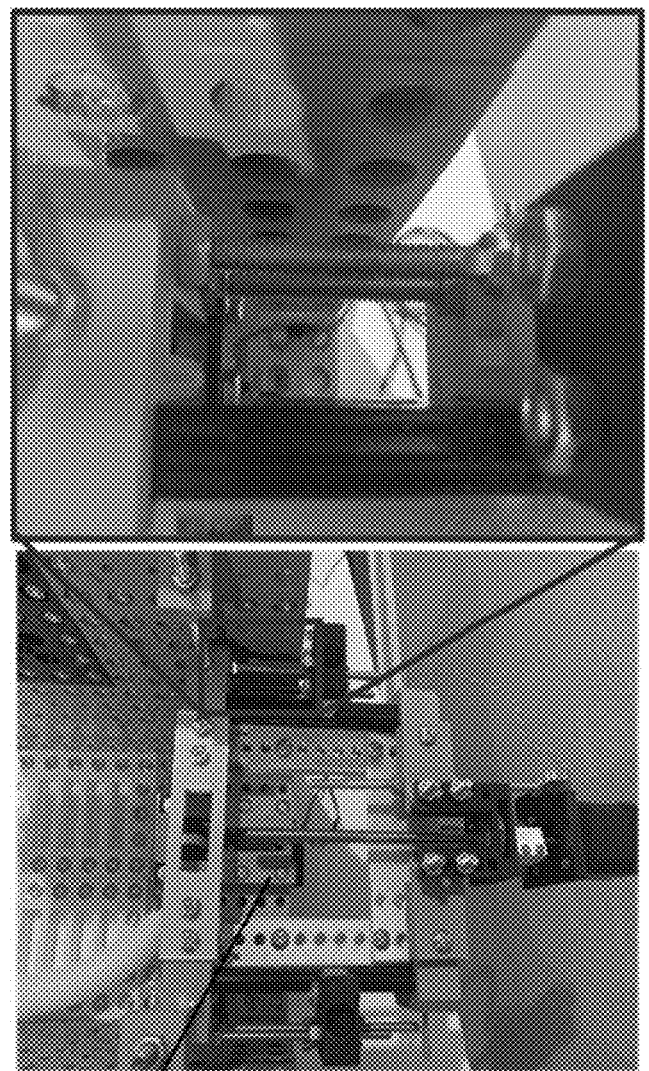
FIG. 15 shows a side/perspective view of x-axis adjustments of a jaw relative to a sample cage of the present disclosure.
Figure 16:
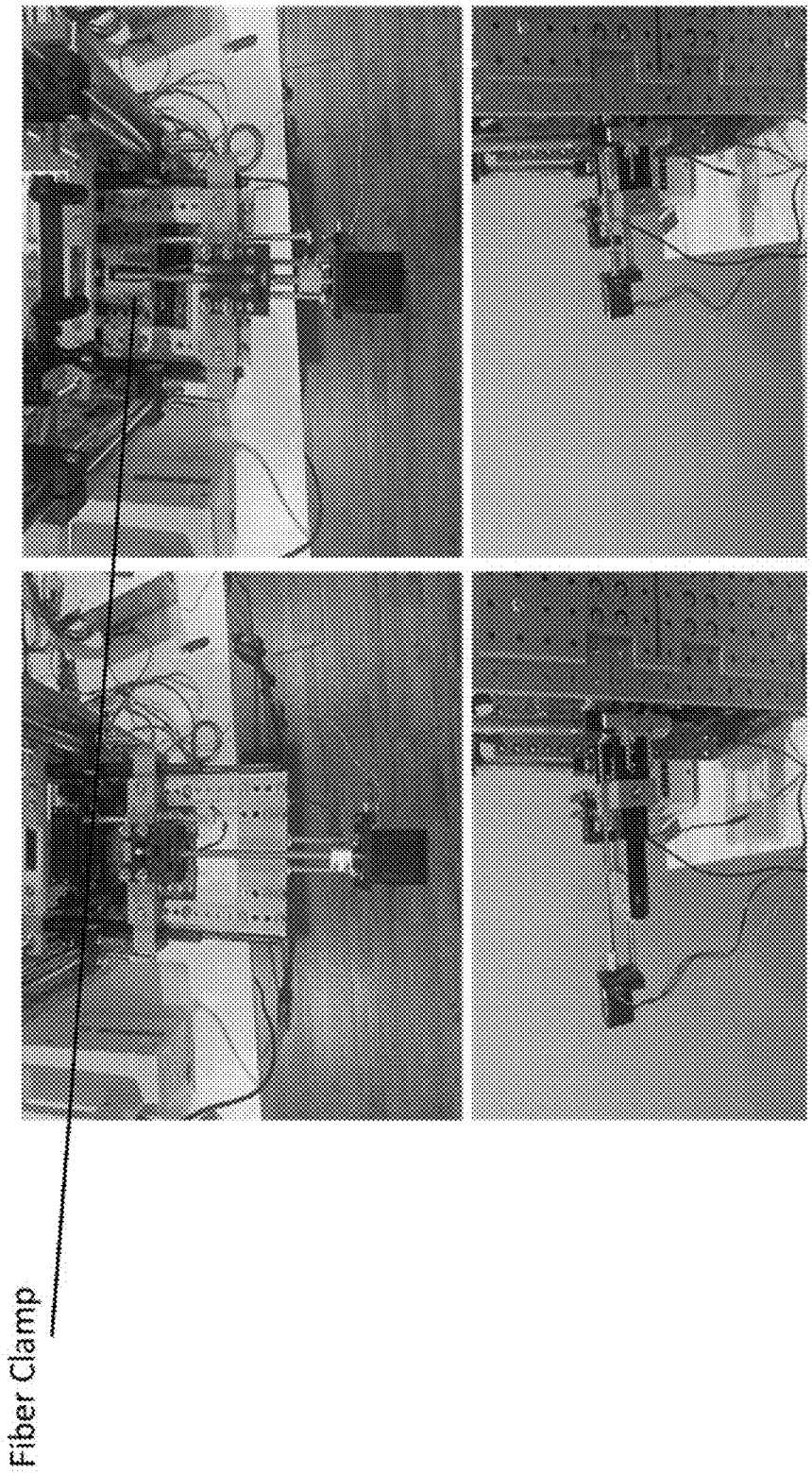
FIG. 16 shows various views of a system and apparatus of the present disclosure with a sampling module withdrawn and engaged with a sampling area.

The system 20 also includes a pressure arm pivotally attached to the system 20 between sample cage. The pressure arm may hinge at the base of the inside of the sample cage. When a sample is placed between the sample cages, the pressure arm may press the sample against the sample plate such that a portion of the sample protrudes from the holes of the sample plate. Advantages to the pressure arm of the present disclosure is that it allows the user to set the amount of pressure applied to the sample using a spring loading mechanism (FIG. 13). This can be adjusted based on fiber type of desirable beard properties.

With reference to FIGS. 17-27, the system 20 may also include a fiber clamp attached to the x-axis frame member. The fiber clamp is designed to work with the fiber and prepare a beard with a desired characteristics. The fiber clamp may present a plurality of teeth with various tooth lengths, spacing, arrangement, and diameters. The fiber clamp, and its design attributes such as tooth length, spacing, arrangement and diameters should be considered based on the desired fiber. The fiber clamp to the portion of the sample protruding from the holes of the sample plate and to the protruding sample to extrude sample fibers. In some embodiments, the sample cage may be rotated to drag the protruding across an open fiber clamp.

Figure 17:
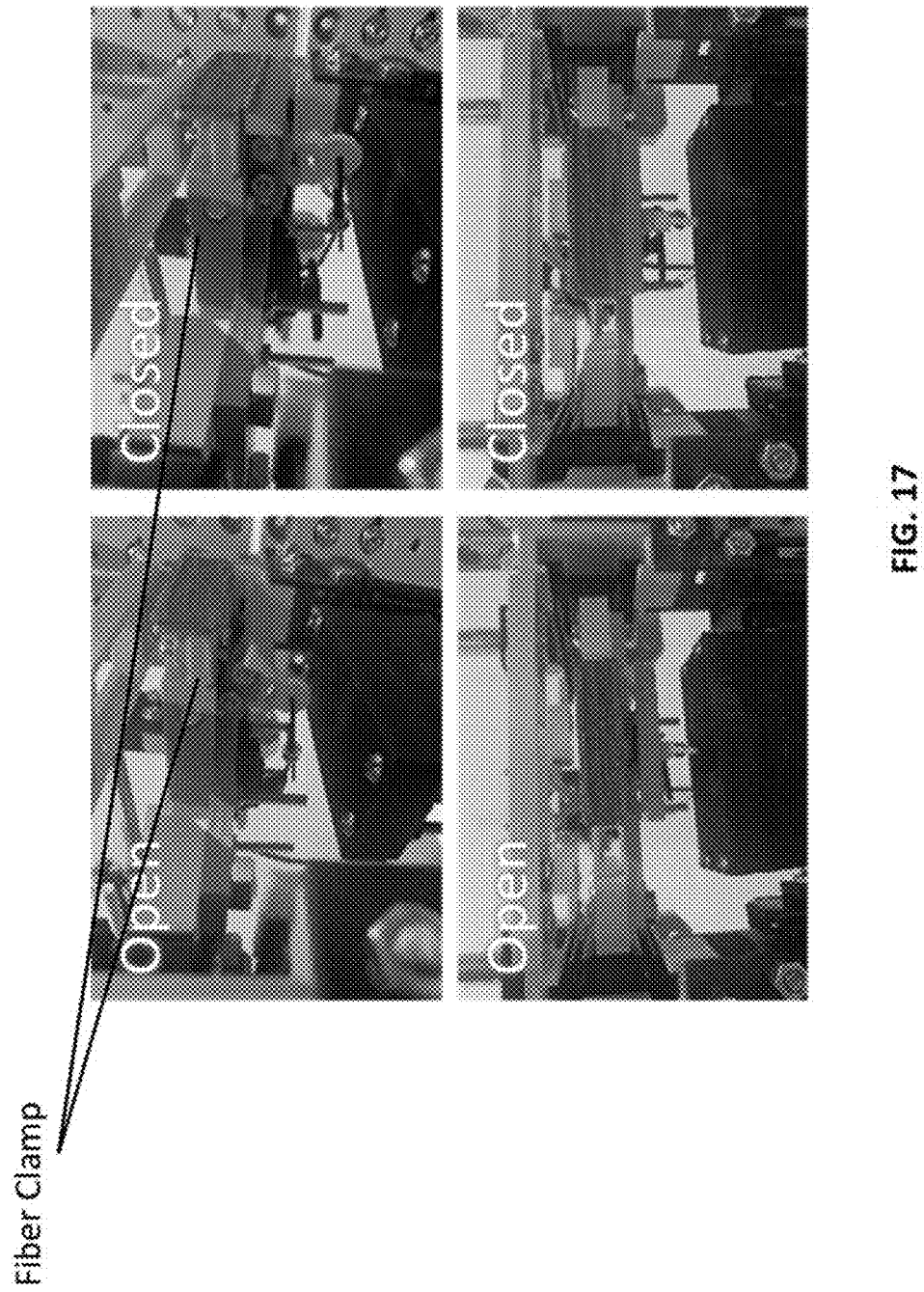
FIG. 17 shows close-up view of the fiber clamp open and closed.

Existing systems present a fiber clamp to the cage in a direction parallel with the face of the sampling plate. The present disclosure, however, presents the fiber clamp to the sample plate in a movement perpendicular to the plate. Accordingly, the system can dynamically adjust the point of contact between the fiber comb and sample cage, allowing for a wider array of clamp designs. No other know system, supports different clamp designs and sampling cage grid plates. Additionally, the disclosed system 20 provides a more compact instrument design. Once the fiber clamp is delivered to the fibers protruding from the sampling cage face, the clamp is opened (FIG. 17). The fibers bulging from the face are dragged across the clamp and the clamp is closed.

With reference to FIGS. 6 and 19-22, the system may also comprise a cleaning module movably couple to the base 22, and may be raised and lowered relative to the base 22 or the x-axis frame member. The cleaning module may include a suction end, and a sample comb. When the fiber clamp extrudes fibers, the cleaning module may be lifted and brought into an open state. A vacuum (see FIG. 4) is connected to the suction end and is used to draw the fibers into the suction end while the fibers are being held in the closed fiber clamp. The cleaning module is then activated to begin cleaning the sample, i.e., by suction and/or combing. The current embodiment of the present disclosure performs this cleaning by applying suction, closing a comb on the base of the fiber. The cleaning module is lowered once cleaning is complete. In some embodiments, the comb may be attached to the x-axis sampler. It is also possible to use a more aggressive cleaning module. In this case, the sample can be presented to the cleaning module multiple times while measuring the changes between each state. This would help provide a measure of the processing performance of the sample.

Figure 26:
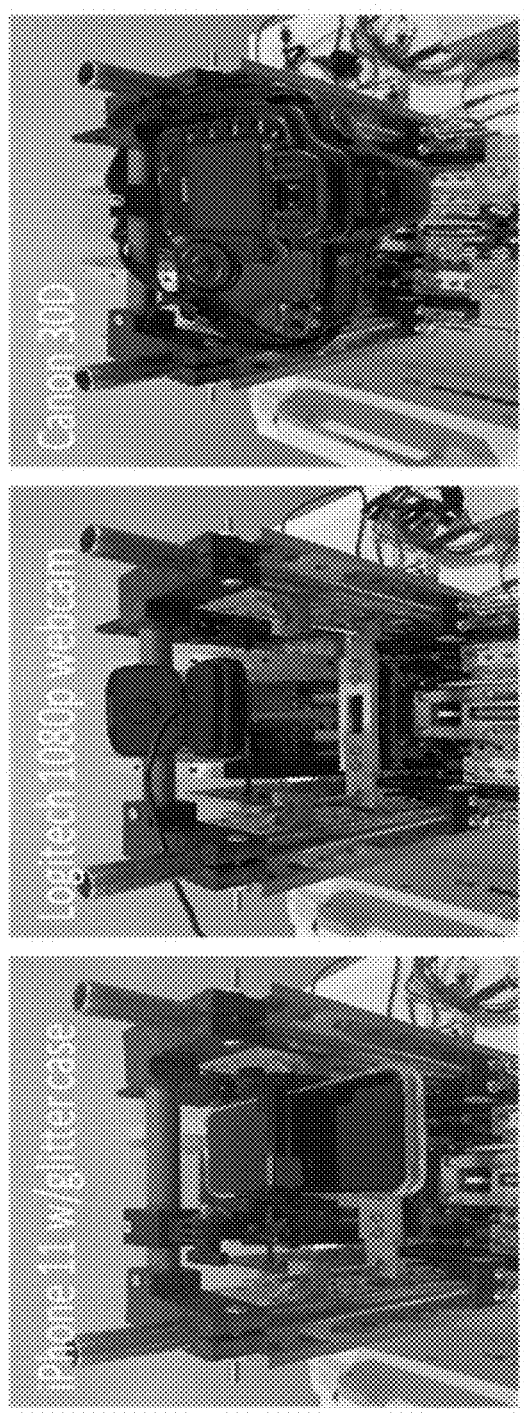
FIG. 26 shows different image capturing devices coupled to a system and apparatus of the present disclosure.

With reference to FIG. 26, the system includes a sensor rail coupled to an upper portion of the y-axis frame member. A sensor such as, but not limited to, an iPhone 11, a Logitech 1080p webcam, and a Canon 30d can all be mounted to the sensor rail. However, a wide array of sensors could be used, including but not limited to hyperspectral, linescan, lidar, infrared, or ultraviolet sensors. If a sensor does not fit on the sensor mount, the sensor mount is removable and a custom sensor mount could be added.

Figure 7:
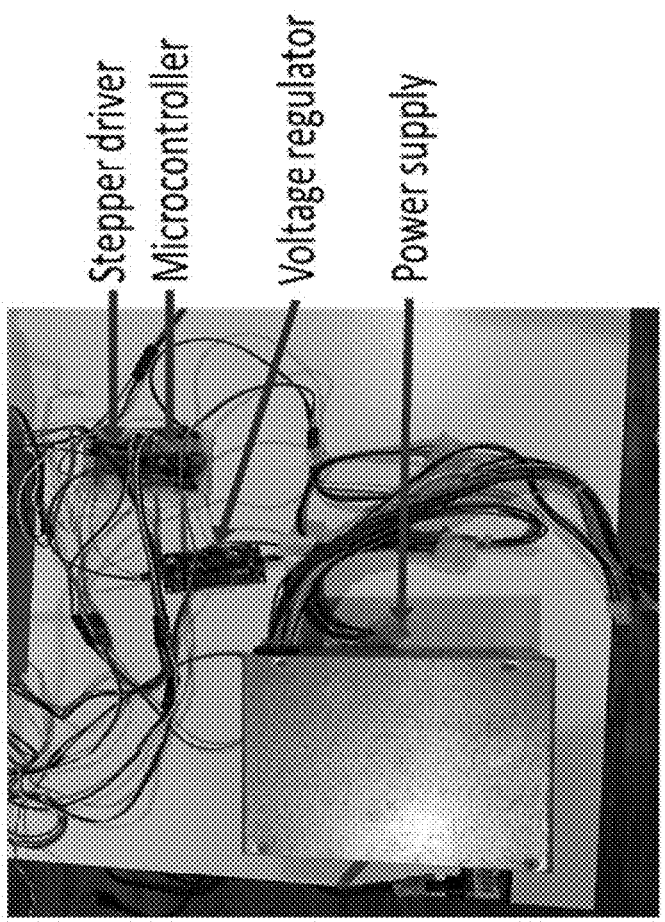
FIG. 7 is a perspective view of electronic components of a system and apparatus of the present disclosure.
Figure 8:
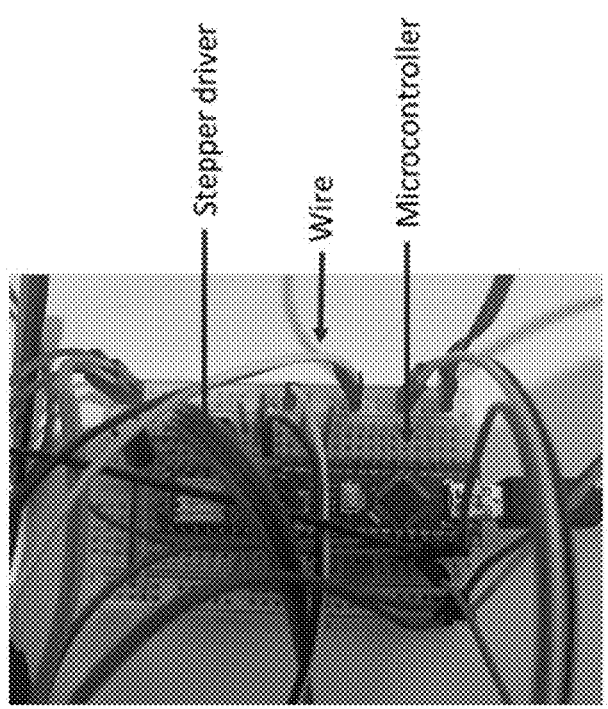
FIG. 8 is a perspective view of a microcontroller breadboard of a system and apparatus of the present disclosure.
Figure 9:
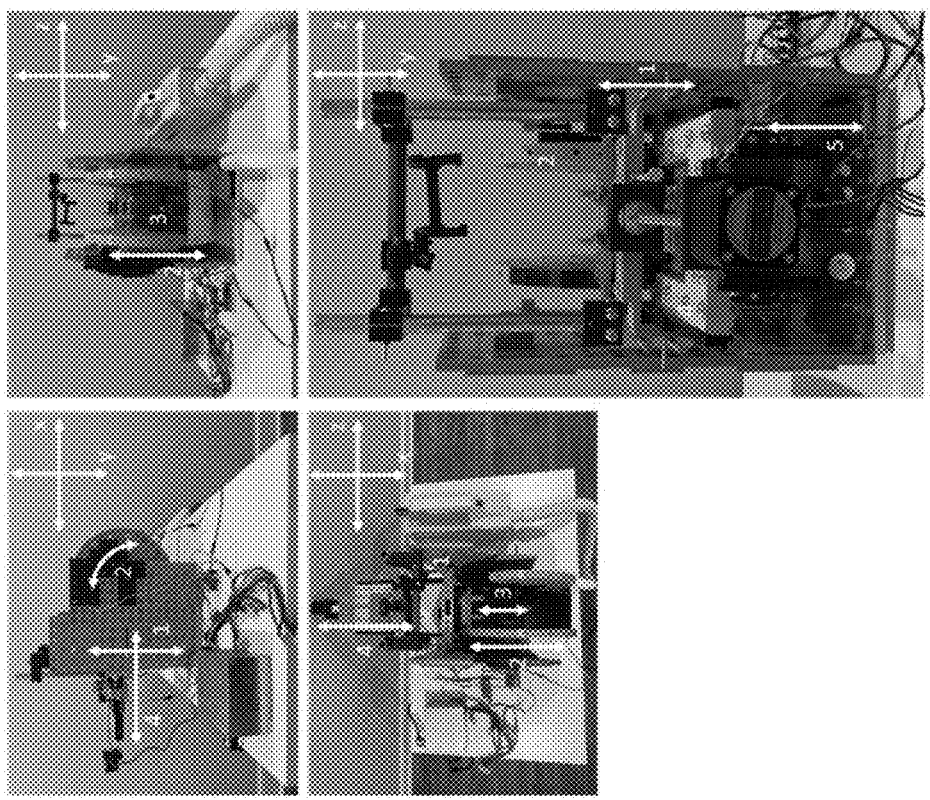
FIG. 9 is a perspective view of a system and apparatus of the present disclosure showing identifying various axis.
Figure 10:
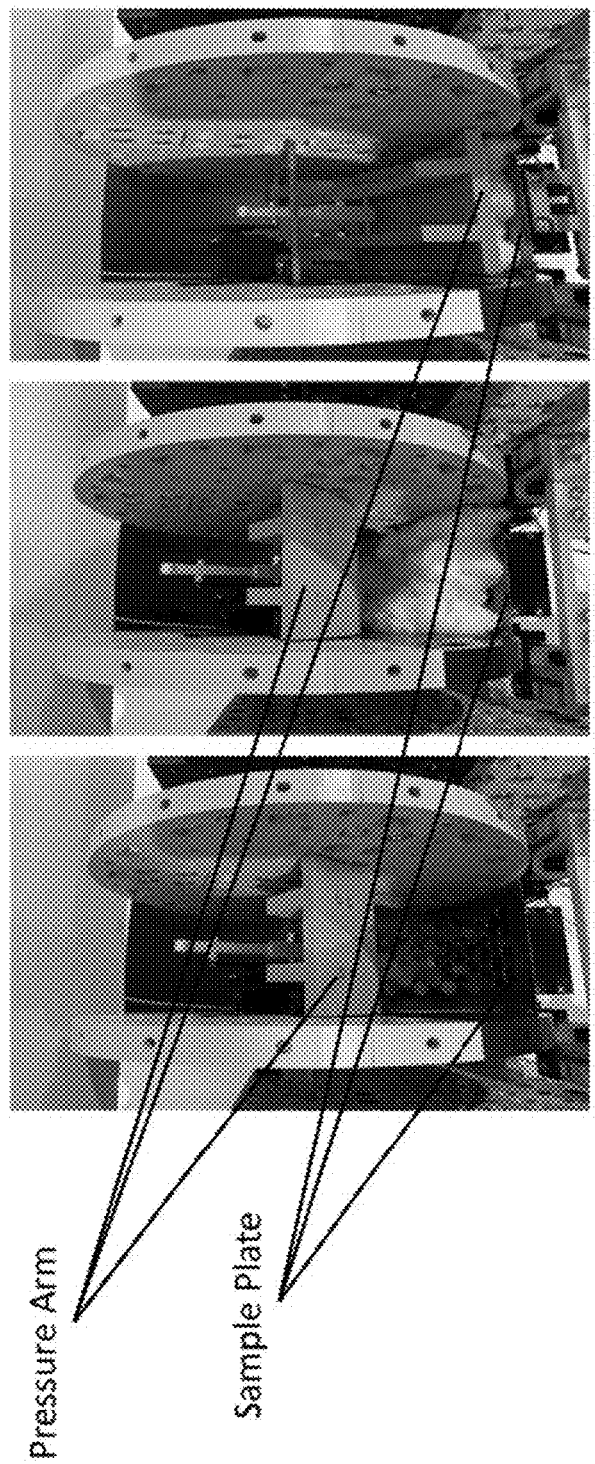
FIG. 10 is a perspective view of a system and apparatus of the present disclosure showing a sample cage in various operational positions.

With reference to FIGS. 7 and 8, the system 20 also includes electronic components establishing a control system. The control system may include as a power supply, a voltage regulator, a stepper driver and a microcontroller. The control system may be configured to cause movement of the x and y-axis frame members, cleaning module, fiber clamp and pressure arm. More specifically, the control system may be configured to implement the following steps: moving the pressure arm to press a sample against the sample plate until a bulge of the sample extends from a hole of the sample plate; adjusting the x-axis and y-axis frame members to move the fiber clamp towards the sample plate; closing the fiber clamp to capture the bulge of the sample; adjusting the x-axis and y-axis frame members to move the fiber clamp away from the sample plate to extrude fibers from the bulge of the sample; moving the cleaning module towards the fibers; signaling for the suction to begin to clean the sample; moving the cleaning module away from the fibers; using the sensor to capture data regarding the fibers.

Figure 27:
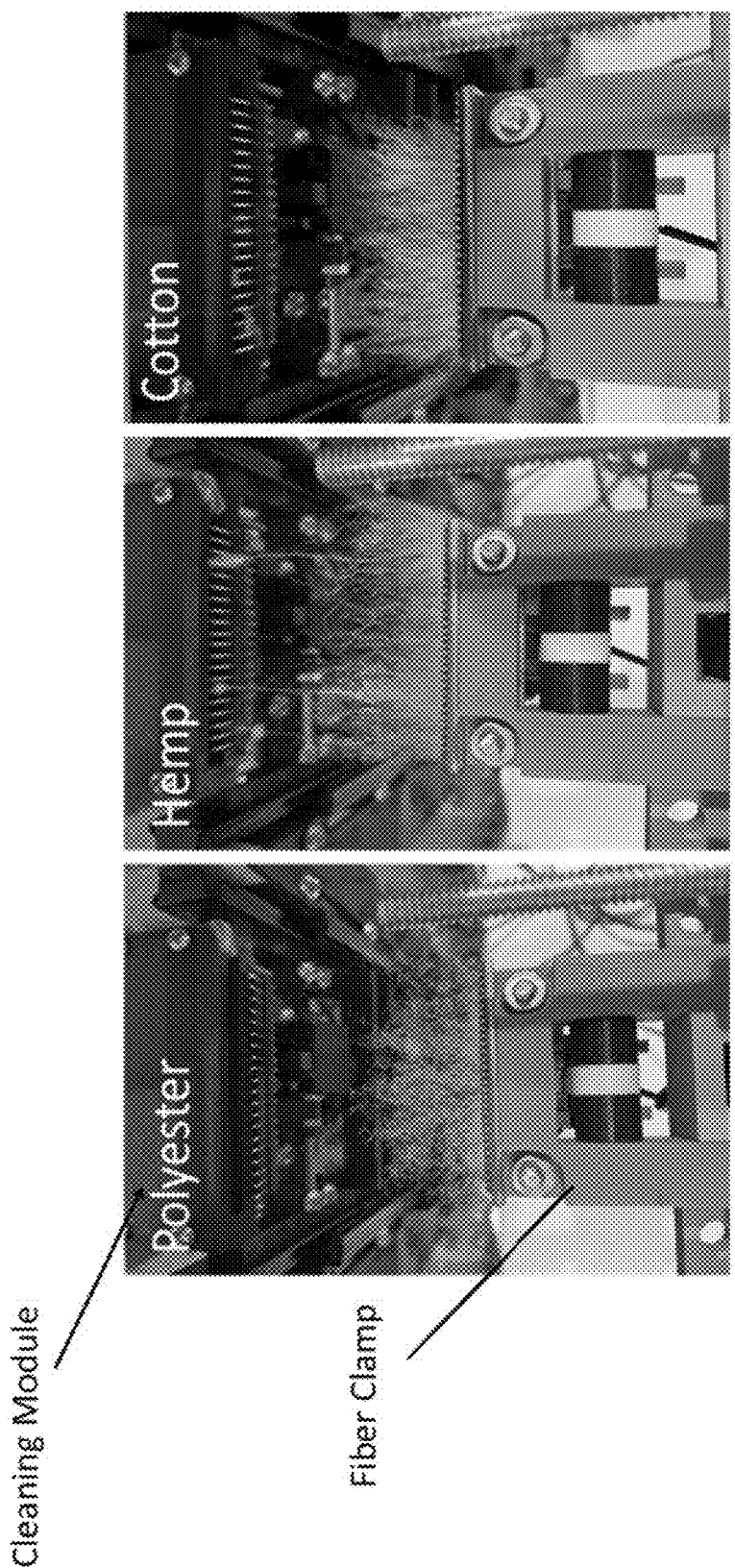
FIG. 27 shows samples of polyester fiber fill, cottonized hemp, and cotton fiber beard being pulled with a clamp.
Figure 28:
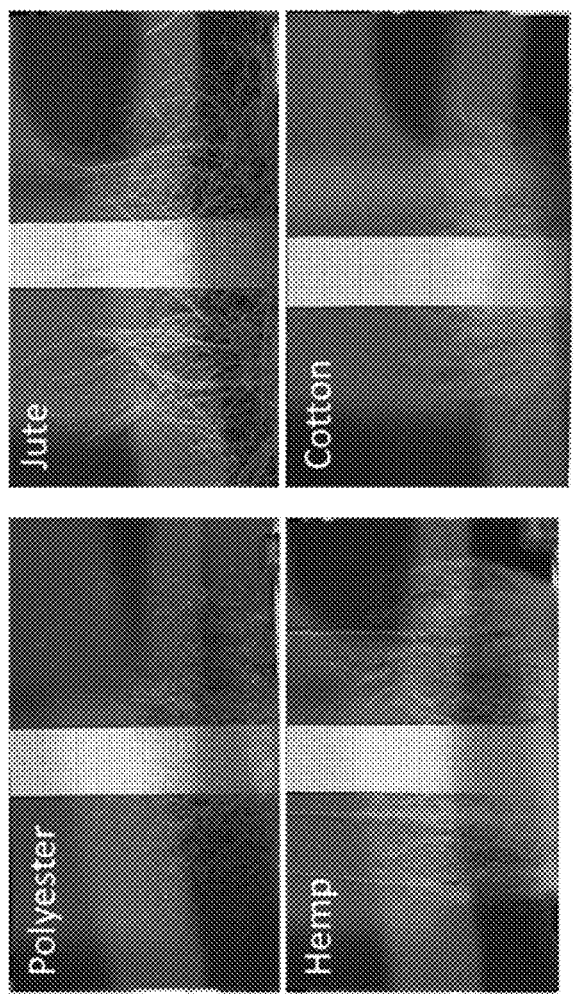
FIG. 28 Samples of polyester fiber fill, jute, cottonized hemp, and cotton fiber beards prepared using a system and apparatus of the present disclosure.

With reference to FIGS. 27 and 28, the present disclosure has successfully prepared beard of several types of natural and manmade fibers, including polyester fiber fill, jute, hemp, and cotton (FIG. 27). A dark purple backing and a small scale are used to provide some scale of the prepared samples (FIG. 28).

Other versions can include one or more of the following embodiments.

A system for generating randomly aligned fiber beards for evaluation, comprising: a base; an x-axis frame member coupled to and positioned parallel to the base; a y-axis frame member coupled to and positioned perpendicular to the base; a sample plate removably coupled to the y-axis frame member and defining one or more holes; and a fiber clamp coupled to and is movable by the x-axis frame member perpendicularly to the sample plate.

In another embodiment the fiber clamp comprises interchangeable teeth.

In another embodiment the holes of the sample plate are one of a circular or triangular shape.

In another embodiment, the system further comprises a sample cage coupled to the y-axis member and the sample plate removably couples to the sample cage.

In another embodiment, the system further comprises a pressure arm for pressing a sample against the sample plate to cause portions of the sample to bulge through the holes of the sample plate.

In another embodiment, the system further comprises a sensor for sensing a characteristic of sample.

In another embodiment, the present invention provides a method of generating randomly aligned fiber beards for evaluation, comprising: providing a sample plate defining holes; providing a pressure arm; placing a sample between the sample plate and the pressure arm; moving the pressure arm to press the sample against the sample plate to cause portions of the sample to bulge from the holes of the sample plate; moving a fiber clamp perpendicularly relative to the sample plate and causing the fiber clamp to clamp against the bulges of the sample; and moving the fiber clamp to extrude fibers from the bulge.

In another embodiment, the method further comprises sensing with a sensor a characteristic of the fibers.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The term "discreet," as well as derivatives thereof, references to the amount of skin exposed by a user of the garment, rather than the type of style of the garment. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. A system for generating randomly aligned fiber beards for evaluation, comprising:
    a base;
    an x-axis frame member coupled to and positioned parallel to the base;
    a y-axis frame member coupled to and positioned perpendicular to the base;
    a sample plate removably coupled to the y-axis frame member and defining one or more holes; and
    a fiber clamp comprising interchangeable teeth, wherein the fiber clamp is coupled to and movable by the x-axis frame member in a direction perpendicular to a face of the sample plate.

2. The system of claim 1, wherein the holes of the sample plate are one of a circular or triangular shape.

3. The system of claim 1, further comprising a sample cage coupled to the y-axis member and wherein the sample plate removably couples to the sample cage.

4. The system of claim 1, further comprising a pressure arm for pressing a sample against the sample plate to cause portions of the sample to bulge through the holes of the sample plate.

5. The system of claim 1, further comprising a sensor for sensing a characteristic of sample.

6. The system of claim 1, further comprising a cleaning module having a suction end, and a sample comb wherein a vacuum is operably connected to the suction end and capable of drawing the fibers into the suction end while the fibers are being held in said fiber clamp.

7. A method of generating randomly aligned fiber beards for evaluation, comprising:
    providing a sample plate defining holes;
    providing a pressure arm;
    placing a sample between the sample plate and the pressure arm;
    moving the pressure arm to press the sample against the sample plate to cause portions of the sample to bulge from the holes of the sample plate;
    moving a fiber clamp perpendicularly relative to the sample plate and causing the fiber clamp to clamp against the bulges of the sample; and
    moving the fiber clamp to extrude fibers from the bulge.

8. The method of claim 7, further comprising sensing with a sensor a characteristic of the fibers.

9. The method of claim 7, further comprising having the sample contained in a sample cage coupled to the y-axis member and the sample plate removably coupled to the sample cage.

10. The method of claim 7, further comprising pressing a sample against the sample plate using a pressure arm to cause portions of the sample to bulge through the holes of the sample plate.

11. The method of claim 7, further comprising:
    cleaning a sample with a cleaning module having a suction end, and a sample comb wherein a vacuum is operably connected to the suction end; and
    drawing the fibers into the suction end while the fibers are being held in said fiber clamp.

* * * * *